(12) United States Patent
Iwamoto et al.

(10) Patent No.: US 6,540,956 B1
(45) Date of Patent: Apr. 1, 2003

(54) MOLD, BLOW MOLDED PRODUCT, AND MOLDING METHOD

(75) Inventors: Hiroshi Iwamoto, Tochigi (JP); Yuko Tamiya, Tochigi (JP); Naohide Nishimine, Tochigi (JP); Masaharu Hata, Tochigi (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/576,277

(22) Filed: May 24, 2000

Related U.S. Application Data

(62) Division of application No. 09/169,130, filed on Oct. 9, 1998, now abandoned.

(30) Foreign Application Priority Data

Oct. 9, 1997 (JP) .............................................. 9-277616

(51) Int. Cl.$^7$ .............................................. B29C 49/00
(52) U.S. Cl. ...................................................... 264/523
(58) Field of Search ........................................ 264/523

(56) References Cited

U.S. PATENT DOCUMENTS

| | | | |
|---|---|---|---|
| 4,482,518 A | * 11/1984 | Brady, Jr. ................... | 264/230 |
| 4,631,159 A | * 12/1986 | Maeda et al. ................ | 264/101 |
| 5,378,421 A | * 1/1995 | Salame ........................ | 264/230 |
| 5,405,667 A | 4/1995 | Heider | |

OTHER PUBLICATIONS

U.S. patent application Ser. No. 09/169,129, filed Oct. 9, 1998, abandoned.

* cited by examiner

*Primary Examiner*—Suzanne E. McDowell
(74) *Attorney, Agent, or Firm*—Oblon, Spivak, McClelland, Maier & Neustadt, P.C.

(57) ABSTRACT

In order to provide a mold of a shape which has been designed to take into account the deformation occurring during the cooling process, the mold cavity is formed so that the external volume of a molded product obtained by blow molding in this cavity ultimately shrinks by a prescribed percentage of the volume of the mold cavity, and so that in the region of maximum shrinkage the external size of the body portion of the molded product shrinks by a prescribed percentage of the size of the corresponding portion of the mold cavity.

3 Claims, 3 Drawing Sheets

Extrusion of Parison

Closing Mold

Blowing of Air

Removal of Product

MOLD, BLOW MOLDED PRODUCT, AND MOLDING METHOD

This is a division of application Ser. No. 09/169,130, filed Oct. 9,1998 now abandoned.

BACKGROUND OF THE INVENTION

1. Field of the Invention

The present invention claims priority from Japanese Patent Application No. 9-277616 filed Oct. 9, 1997, which is incorporated herein by reference. It relates to the molding of plastics, particularly to the shape of the mold used in molding techniques, wherein the deformation occurring during cooling is predicted and the plastic molded product is removed from the mold at high temperature.

2. Description of Related Art

A widely practiced method of molding plastic is to extrude high-temperature molten plastic in a tubular shape, enclose this in a mold and cause it to expand by blowing air into the tube. A conventional example of this will be explained with reference to FIG. 3 to FIG. 6, which show the process of manufacturing a container by blow molding.

As shown in FIG. 3, molten plastic in tubular shape (the parison) is extruded into the middle of a split mold, and as shown in FIG. 4, the mold is then closed. As shown in FIG. 5, when air is blown into the molten plastic, the plastic adheres to the inner wall of the mold and assumes the same shape as this inner wall. At this point in time the molten plastic is at a high temperature of for example 200° C., and it is cooled and solidified by keeping it in the mold while continuing to blow in high-pressure air.

The time required for this cooling varies according to the type of plastic and the form of the molded product, and cooling time has hitherto been determined on the basis of the criterion that deformation due to thermal shrinkage of the resin after removal from the mold is linear. As shown in FIG. 6, when the mold is opened, the molded product is removed.

The molded product shown in FIG. 6 is a container (a bottle) which will be marketed after being filled with a liquid, and the resin temperature at which a mold is opened is usually about 50° C. A dozen or so seconds are required for this cooling.

It thus takes time to cool the high-temperature molten plastic to a point at which the mold can be opened. Production per unit time and production cost are in inverse proportion, and in a manufacturing process in which time management is carried out in units of seconds, even a short cooling time of a dozen or so seconds should be shortened in order to achieve lower production cost.

In order to obtain data relating to the shortest practical cooling time, the inventors performed repeated experiments in which a molded product was released from a mold while still at a high temperature. These experiments showed that if a mold is opened up before the conventionally employed cooling time has elapsed, the high-temperature molten plastic shrinks greatly and undergoes nonlinear deformation, so that the target molded product shape is not obtained. In other words, it was found that cooling time could not be shortened.

It would therefore be desirable to predict the nonlinear deformation of a high-temperature molded product after it has been released from a mold, and to develop a mold which enables molten plastic to be molded in such a way that the shape after deformation is the desired shape.

SUMMARY OF THE INVENTION

It is therefore an object of the invention to provide a mold configured such that a target molded product shape can be obtained even though the cooling time in the plastic molding process is shortened.

Plastic which has been released from a mold undergoes shrinkage deformation in the course of cooling to ordinary temperature. Conventionally, removal of the plastic at a low temperature ensures a regularity in the resulting deformation, i.e. the deformation is linear, and therefore by taking the shrinkage factor into account when designing the mold size so as to make the mold suitably larger, the manufacturability of the target molded product shape (i.e. its design dimensions) can be guaranteed.

However, the broad regularity mentioned above is not found in the course of the nonlinear shrinkage which occurs when a plastic molded product is removed from a mold at high temperature. The inventors have therefore invented a method and apparatus for mold design whereby a target molded product shape is obtained even when a molded product is removed from a mold at high temperature. This is achieved by using the finite element method to simulate deformation behavior, and by taking this deformation into account beforehand when fabricating the shape of the mold (Japanese Patent Application Laid-open No. No. 9-277260). This method and apparatus for mold design ensure that a mold shape which takes nonlinear deformation into account in advance is achieved.

According to a first aspect of the present invention, a mold for blow molding a blow thermoplastic molded product has a mold cavity formed so that the external volume of the molded product obtained by blow molding in this cavity ultimately shrinks by at least 5.8% and at most 13.5% of the volume of the cavity.

High-density polyethylene (HDPE) can be used for the aforementioned thermoplastic, and in this case the mold cavity is preferably formed so that the external volume of the molded product obtained by blow molding in this cavity ultimately shrinks by at least 7.0% and at most 13.5% of the volume of the cavity. This volume shrinkage factor is measured when the temperature has decreased to a normal temperature (20° C.) from the temperature at which the HDPE begins to crystallize (130° C.), and assumes a coefficient of linear expansion of $5.98 \times 10^{-4}/°$ C.

Polypropylene (PP) can also be used for the aforementioned thermoplastic, in which case the mold cavity is preferably formed so that the external volume of the molded product obtained by blow molding in this cavity ultimately shrinks by at least 5.8% and at most 8.5% of the volume of the cavity.

The mold cavity can also be formed so that the external volume of the molded product obtained by blow molding in this cavity ultimately shrinks by at least 5.8% and at most 13.5% of the volume of the cavity, and so that in the region of maximum shrinkage the external size of the body portion of the molded product shrinks by at least 1.0% and at most 10.5% of the size of the corresponding portion of the mold cavity.

If the aforementioned thermoplastic is HDPE, the mold cavity is preferably formed so that the external volume of the molded product obtained by blow molding in this cavity ultimately shrinks by at least 7.0% and at most 13.5% of the volume of the cavity, and so that in the region of maximum shrinkage the external size of the body portion of the molded product shrinks by at least 1.5% and at most 10.5% of the size of the corresponding portion of the mold cavity.

Alternatively, if the aforementioned thermoplastic is PP, the mold cavity is preferably formed so that the external volume of the molded product obtained by blow molding in this cavity ultimately shrinks by at least 5.8% and at most 8.5% of the volume of the cavity, and so that in the region of maximum shrinkage the external size of the body portion of the molded product shrinks by at least 1.0% and at most 10.5% of the size of the corresponding portion of the mold cavity.

According to a second aspect of the present invention, a blow molded product formed using the aforementioned mold, and a method using the aforementioned mold, are provided.

According to a third aspect of the present invention, a blow molded product on the body portion of which an in-mold label has been affixed during blow molding using the aforementioned mold is provided, said in-mold label excluding labels which do not thermally shrink after removal from a mold.

As has been explained above, the present invention is capable of providing a mold such that a target molded product shape can be obtained even though the cooling time in the plastic molding process is shortened.

DETAILED DESCRIPTION OF THE PREFERRED EMBODIMENTS

Figure 1:
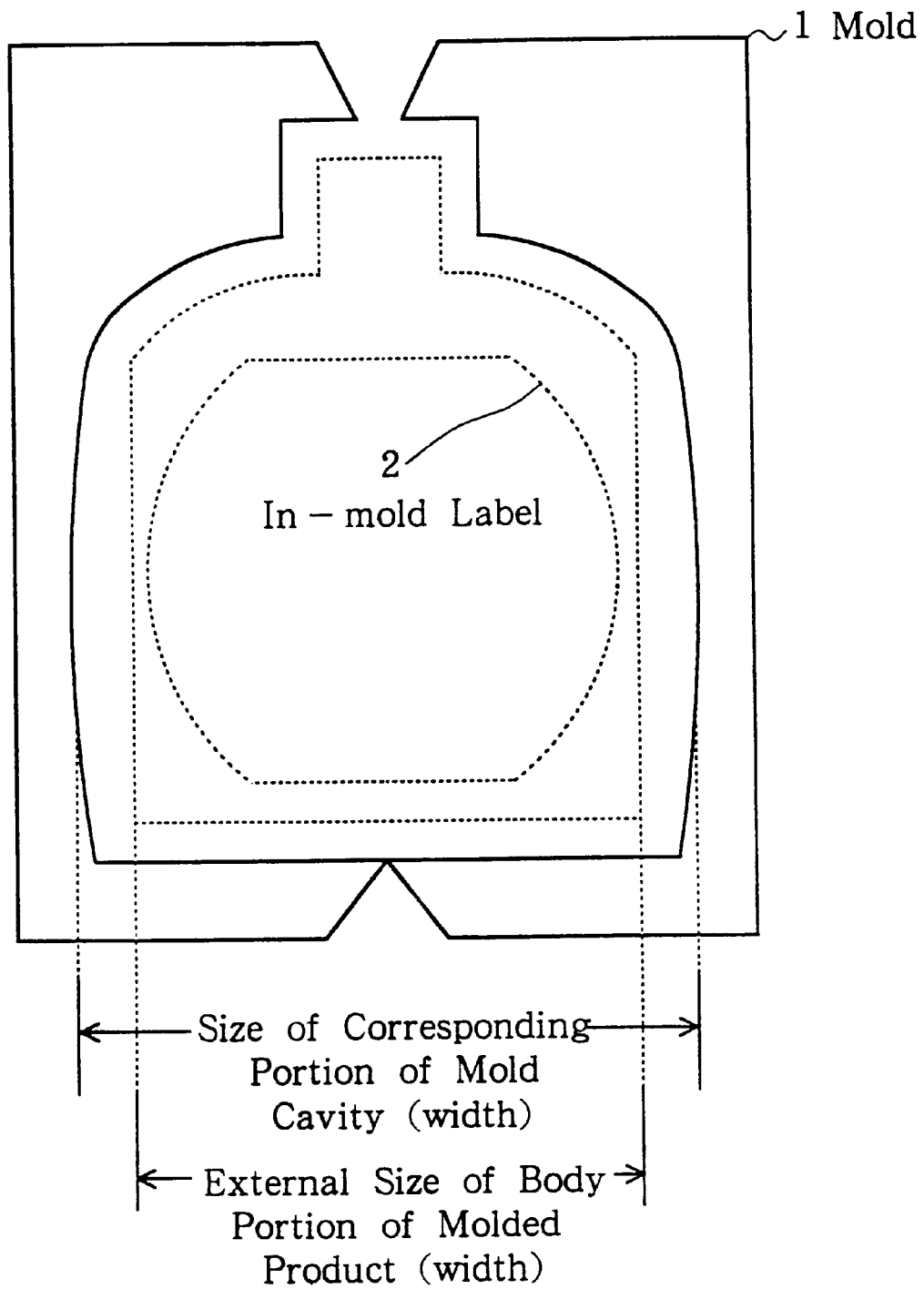
FIG. 1 shows the front of a mold according to an embodiment of the present invention.
Figure 2:
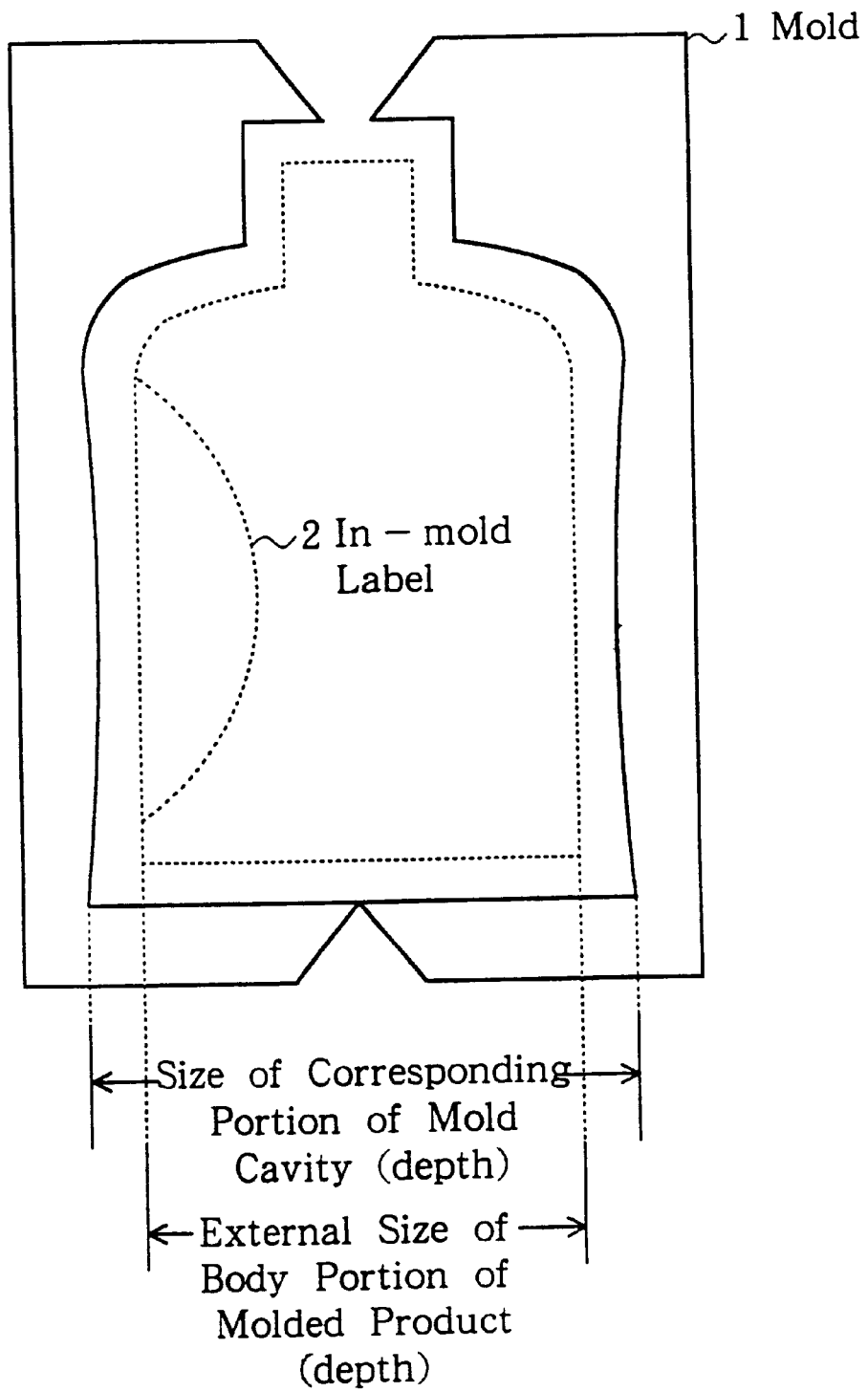
FIG. 2 shows the side of a mold according to an embodiment of the present invention.
Figures 3, 4, 5, 6:
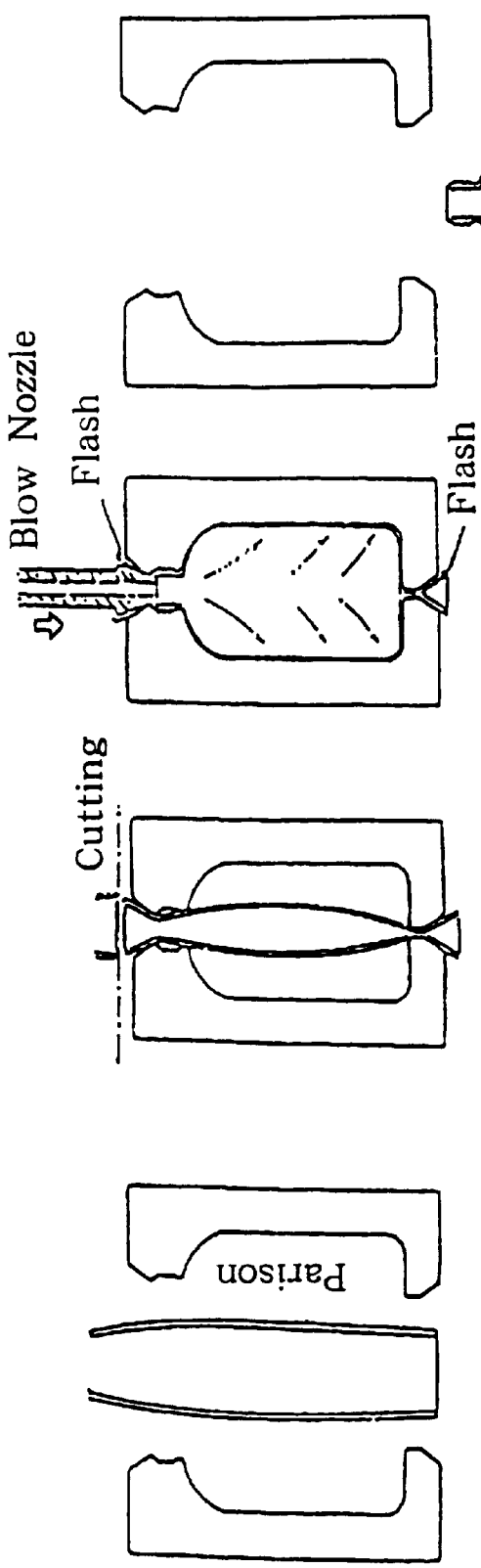
FIG. 3 to FIG. 6 show the processes involved in manufacturing a container by blow molding.

Embodiments of the invention will be explained with reference to FIG. 1 and FIG. 2, which respectively show the front and side of a mold according to embodiments of this invention. The broken lines in these figures indicate the shape of the molded product after cooling.

This invention is mold 1 for blow molding a bottle, which is a blow molded thermoplastic product. The cavity of mold 1 is formed so that the external volume of the molded product obtained by blow molding in this cavity ultimately shrinks by at least 5.8% and at most 13.5% of the volume of the cavity.

High-density polyethylene (HDPE) can be used for the aforementioned thermoplastic, and in this case the cavity of mold 1 is formed so that the external volume of the molded product obtained by blow molding in this cavity ultimately shrinks by at least 7.0% and at most 13.5% of the volume of the cavity. Polypropylene (PP) can also be used for the aforementioned thermoplastic, in which case the cavity of mold 1 is preferably formed so that the external volume of the molded product obtained by blow molding in this cavity ultimately shrinks by at least 5.8% and at most 8.5% of the volume of the cavity. The cavity of mold 1 can also be formed so that the external volume of the molded product obtained by blow molding in this cavity ultimately shrinks by at least 5.8% and at most 13.5% of the volume of the cavity, and so that in the region of maximum shrinkage the external size of the body portion of the molded product shrinks by at least 1.0% and at most 10.5% of the size of the corresponding portion of the cavity of mold 1.

If the aforementioned thermoplastic is HDPE, the cavity of mold 1 is formed so that the external volume of the molded product obtained by blow molding in this cavity ultimately shrinks by at least 7.0% and at most 13.5% of the volume of the cavity, and so that in the region of maximum shrinkage the external size of the body portion of the molded product shrinks by at least 1.5% and at most 10.5% of the size of the corresponding portion of the cavity of mold 1. Alternatively, if the aforementioned thermoplastic is PP, the cavity of mold 1 is formed so that the external volume of the molded product obtained by blow molding in this cavity ultimately shrinks by at least 5.8% and at most 8.5% of the volume of the cavity, and so that in the region of maximum shrinkage the external size of the body portion of the molded product shrinks by at least 1.0% and at most 10.5% of the size of the corresponding portion of the cavity of mold 1.

In-mold label 2 is affixed to the molded product during blow molding, said in-mold label excluding labels which do not thermally shrink after removal from a mold.

These embodiments of the invention will now be further explained with reference to the following table.

TABLE

| Type of plastic | | HDPE | | | | PP | |
|---|---|---|---|---|---|---|---|
| embodiments | | A | B | C | D | E | F |
| shrinkage of external volume of molded product relative to volume of mold cavity (%) | | 7.2 | 10.5 | 9.5 | 13.0 | 5.8 | 8.4 |
| maximum shrinkage of external size of body portion of molded product relative to size of mold cavity (%) | width | 4.0 | 8.3 | 4.4 | 1.6 | 1.9 | 1.2 |
| | depth | 3.7 | 5.6 | 4.0 | 10.1 | 5.2 | 10.2 |
| cooling time (seconds) | | 5.5 | 6.0 | 5.0 | 5.5 | 7.0 | 4.5 |
| removal temperature (° C.) | | 94 | 85 | 104 | 86 | 85 | 82 |

High-density polyethylene (HDPE) and polypropylene (PP) are used in these embodiments as the material for the bottle. When HDPE is used, the temperature of the body portion of the molded product when it is removed from a mold according to these embodiments is 80° C. to 104° C. This removal temperature was measured at the body portion of the molded product immediately after it was removed from the mold, using a radiation thermometer (a TVS-100 manufactured by Nippon Avionics Co., Ltd.). The referenced body portion is the portion of the container from the bottom face to the neck. Hence the molded product can be removed from the mold at a considerably higher temperature than the conventional removal temperature of 45° C. to 57° C. When HDPE is used, mold 1 from which molded products can be removed at high temperature has a mold cavity formed so that the external volume of the molded product obtained by blow molding in this cavity of mold 1 ultimately shrinks by at least 7.0% and at most 13.5% of the volume of the cavity, and so that in the region of maximum shrinkage the external size of the body portion of the molded product shrinks by at least 1.5% and at most 10.5% of the size of the corresponding portion of the cavity of mold 1.

The preferred embodiments in the case of HDPE are high-speed products A and B. For these, the external volume of the molded product shrinks by 7.2% and 10.5% respectively of the volume of the cavity of mold 1, and in the region of maximum shrinkage the external size of the body portion of the molded product shrinks by 4.0% and 8.3% respectively of the size of the corresponding portion of the cavity of mold 1. The external volume of the molded product preferably shrinks by at least 7.0% and at most 10.7% of the volume of the cavity of mold 1, and in the region of maximum shrinkage the external size of the body portion of the molded product preferably shrinks by at least 3.8% and at most 8.5% of the size of the corresponding portion of the cavity of mold 1.

In the prior art the shrinkage of the external volume of the molded product was less than about 5.8% of the volume of the cavity of mold 1, and in the region of maximum shrinkage the shrinkage of the external size of the body portion of the molded product was at least 1.8% and at most 2.7% of the size of the corresponding portion of the cavity of mold 1.

When PP is used, the temperature of the body portion of the molded product when it is removed from a mold according to these embodiments is 82° C. to 85° C. This removal temperature was measured in the same way as in the case of the HDPE molded products. The molded PP product can be removed from the mold at a considerably higher temperature than the conventional mold removal temperature of 46° C. to 62° C.

When PP is used, mold 1 from which molded products can be removed at high temperature has a mold cavity formed so that the external volume of the molded product ultimately shrinks by at least 5.8% and at most 8.5% of the volume of the cavity of mold 1, and so that in the region of maximum shrinkage the external size of the body portion of the molded product shrinks by at least 1.0% and at most 10.5% of the size of the corresponding portion of the cavity of mold 1.

The preferred embodiment in the case of PP is high-speed product E. For this, the external volume of the molded product shrinks by 5.8% of the volume of the cavity of mold 1, and in the region of maximum shrinkage the external size of the body portion of the molded product shrinks by 5.2% of the size of the corresponding portion of the cavity of mold 1. The external volume of the molded product preferably shrinks by at least 5.6% and at most 7.5% of the volume of the cavity of mold 1, and in the region of maximum shrinkage the external size of the body portion of the molded product preferably shrinks by at least 4.0% and at most 8.0% of the size of the corresponding portion of the cavity of mold 1.

In the prior art the shrinkage of the external volume of the molded product was at least 3.7% and less than 5.8% of the volume of the cavity of mold 1, and in the region of maximum shrinkage the shrinkage of the external size of the body portion of the molded product was at least 1.7% and at most 2.7% of the size of the corresponding portion of the cavity of mold 1. As shown in the table, the cooling time can be reduced from the 7 to 12 seconds required with a prior art mold to 4.5 to 7.0 seconds.

What is claimed is:

1. A method for blow molding a thermoplastic product, comprising the steps of:

providing a mold cavity sized such that the external volume of a molded product blow molded in the cavity has a desired shape and size after an initial external volume of the molded product has shrunk by between 5.8% and 13.5% of the volume of the cavity;

blow molding a thermoplastic product in the mold cavity; and permitting the initial external volume of the thermoplastic product to shrink by between 5.8% and 13.5% of the volume of the cavity.

2. A method according to claim 1, wherein the thermoplastic is high-density polyethylene (HDPE) and the molded product shrinks by between 7.0% and 13.5% of the volume of the cavity.

3. A method according to claim 1, wherein the thermoplastic is polypropylene (PP) and the initial external volume of the molded product shrinks by between 5.8% and 8.5% of the volume of the cavity.

* * * * *